Aug. 13, 1957  W. J. JACOBI ET AL  2,803,006

RADIO SYSTEM FOR RELAYING INFORMATION SIGNALS

Filed March 11, 1946

INVENTORS
WILLIAM J. JACOBI
BRUCE CORK
BY
M. Q. Hayes
ATTORNEY

United States Patent Office 2,803,006
Patented Aug. 13, 1957

2,803,006

RADIO SYSTEM FOR RELAYING INFORMATION SIGNALS

William J. Jacobi, Princeton, N. J., and Bruce Cork, Peck, Mich., assignors, by mesne assignments, to the United States of America as represented by the Secretary of the Navy Application March 11, 1946, Serial No. 653,489

3 Claims. (Cl. 343—6)

This invention relates to a system for transmitting two types of radar data to a point remote from a radar system. More particularly, it relates to means for distinguishing between the two types of data at the receiving location.

Radar systems have been developed using a radar set to search a given area and a radio transmitter to relay the information obtained back to remote indicators aboard a ship or other location. The radar set may employ a rotating antenna system to scan a wide area and may include in addition to the object detecting system an object identification system known as an Identification Friend or Foe system, or simply IFF. In practice, radar pulses are transmitted periodically and target reflected echoes of these transmitted pulses are received during a predetermined time interval following such transmission, the length of the time interval depending upon the maximum range of the radar system. Usually the time interval during which radar echoes are received will not occupy the full time interval between successive transmitted pulses. Therefore, the time interval during which echoes are not being received may be utilized to present other data relating to the operation of the radar system. In a relay system employing remote indicators, information relating to the instantaneous azimuthal position of the antenna is usually transmitted during this interval. A typical sequence of operation might be as follows: A single pulse is transmitted from the relay transmitter to the remote indicators to inform the remote indicators that certain data is about to be transmitted. This first pulse is then followed by one or more pulses, for example two pulses, indicating the azimuth of the antenna of the radar transmitter. The spacing between these last-mentioned two pulses and the first pulse transmitted may be the characteristic indicative of the azimuthal position of the antenna. It should be remembered that these three pulses are transmitted by the relay transmitter at the radar transmitter and not by the radar transmitter itself. These three pulses are not intended to induce target reflected echoes. Now at some fixed time relative to the time the relay transmitter sent the first pulse to the remote indicator the radar transmitter transmits a pulse which results in target reflected echoes. These target reflected echoes are coupled to the relay transmitter for retransmission to the remote indicator. Thus, each interval during which radar echoes are retransmitted by the relay transmitter is preceded by a pulse train presenting certain other data. For purposes of the following description this pulse train will be referred to as the main pulse train to distinguish it from the train of radar echo pulses. This pulse train will be further referred to as a coded pulse train since the position of the pulses within the train conveys certain data to the remote indicators.

If the relay transmitter is also retransmitting IFF information, it is customary to suppress the retransmission of radar echo signals during alternate transmission periods and to substitute therefor the IFF data. The sequence of transmission from the relay transmitter would then be a main pulse train, a series of retransmitted radar echo signals, a second main pulse train followed by a series of retransmitted IFF pulse signals. This sequence would be cyclically repeated. Patent application Serial No. 639,282 for "Combination Identification Detection System" filed January 5, 1946 by Andrew B. Jacobsen and Louis A. Turner discloses means for substituting the IFF data for the radar echo data on alternate transmission periods. A data transmission system for use in such a system is described more fully in patent application Serial Number 631,746 for a "Data Transmission System" filed November 29, 1945 by Andrew B. Jacobsen, now Patent No. 2,643,333 dated June 23, 1953. On relaying such synchronizing information as described in said application, it is often important that military security be preserved. It is also important that there be no confusion as a result of spurious interference such as atmospheric noise or other electromagnetic radiation. Accordingly, a system for coding such synchronizing information has been developed and is described more fully in patent application Serial Number 617,365 for a "Coded Data Transmission System" filed September 19, 1945 by Andrew B. Jacobsen, now Patent No. 2,772,399 dated November 27, 1956. Briefly this system contemplates impressing a further pulse code on each pulse of the main pulse train. This further pulse code may be achieved by replacing each code in the main pulse train by two, three or more pulses spaced at preselected intervals from each other. Generally, the radar echoes are not encoded. However, since an understanding of the operation of this further encoding is not essential to the proper understanding of the present invention no further details of the system for further encoding will be presented herein. In the description of the operation that follows the reference to coded pulse trains will refer to the position of the pulses within the pulse train and not to the further encoding just described.

In the system described in the above applications two different types of IFF data are obtained. One is displayed on a conventional A type indicator where it can be readily recognized. The other IFF information is displayed on a main plan position indicator, hereinafter abbreviated P. P. I. in the form of a polar plot. The IFF data displayed on the P. P. I. which will be the IFF referred to hereinafter, is sometimes lost in saturated echoes or sea return. As is disclosed in application Number 639,282 referred to above when on IFF operation, alternate intervals between main high power transmitted pulses are used to obtain and relay radar and then IFF information to the remote point. Thus on one cycle the target echoes following the main pulse train are relayed. On the succeeding pulse, target echoes, although received, are not relayed, but received IFF information is relayed. However due to the persistence of the screen of the P. P. I., interference between IFF and radar data results.

Thus it is an object of this invention to improve the presentation of IFF information at the remote indicators of the system by using a separate IFF indicator.

Another object of this invention is to provide a means for differentiating the main transmitted pulse train of the IFF cycle from the main pulse train of the radar cycle to produce a trigger for operating an auxiliary P. P. I. solely for IFF presentation.

These and other objects will be apparent from the following specification when taken with the accompanying drawing in which.

The relay system will now be described briefly before describing the features of the invention in detail. A synchronizer serves as the central control of the radar and relay transmitter system. This synchronizer, among other functions, supplies coded synchronizing data, followed by radar video or IFF video to the relay transmitter. In addition it supplies an IFF trigger pulse, for a local interrogator, only on each IFF cycle when the IFF is being used. The coded synchronizing data and video are received by a relay receiver which detects the signals and applies them to a decoder whch decodes the synchronizing signals and separates the synchronizing data and video. The synchronizing signals are then used to operate the necessary synchro equipment and trigger the various indicators as described in the above mentioned applications.

Figure 1A:
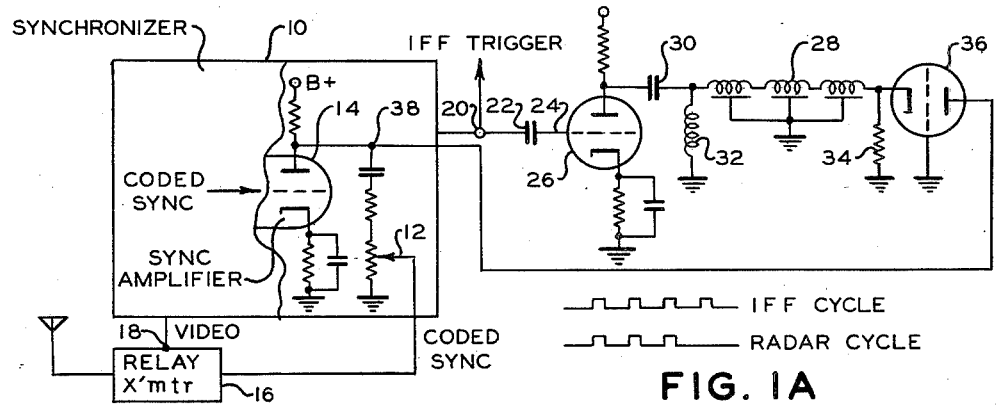
Fig. 1A shows part of the relay transmitting system with some features of the invention.

The radar and IFF relay system using the features of this invention will now be described in detail with reference to Figs. 1A, 1B, and 2. Referring to Fig. 1A, synchronizer 10 develops a series of synchronizing pulses comprising; a basic pulse which initiates each cycle followed by two azimuth pulses for controlling the rotation of the remote P. P. I. sweeps and then a main pulse at the time the radar transmitter fires. The basic pulse and the two azimuth pulses form the normal coded main pulse train 200 shown in Fig. 2. The video data or IFF data follow right after the main pulse train. These synchronizing pulses are taken out from sync amplifier 14 at contact 12 and are applied to relay transmitter 16. Video data is applied from synchronizer 10 to relay transmitter 16 at terminal 18 and both the synchronizing pulses and video are transmitted to receiver 18 at the remote station. In addition synchronizer 10 supplies a trigger pulse, 202 Fig. 2, at terminal 20 to the IFF interogator on every other cycle of operation when on IFF operation, since the IFF operates on an alternate basis with the radar as explained in application #639,282 referred to above. Thus the normal output of synchronizer 10 is a series of sync pulses similar to coded main pulse train 200 Fig. 2, an IFF trigger pulse 202 Fig. 2, and radar or IFF video data as the case may be.

The rest of the circuit of Fig. 1A containing parts of this invention are employed to distinguish the main pulse train of an IFF cycle from the main pulse train of a radar cycle. IFF trigger 202 Fig. 2 is coupled through capacitor 22 to the grid 24 of a conventional electron tube amplifier 26. Amplifier tube 26 inverts and amplifies trigger pulse 202 Fig. 2, and applies it to delay line 28 through coupling capacitor 30. Inductance 32 serves as an input to delay line 28 and resistance 34 terminates delay line 28 in its characteristic impedance. Delay line 28 delays the IFF trigger pulse 202 Fig. 2 a length of time $e$ as shown by waveform 202' Fig. 2. Time interval $e$ is greater than the time interval $a+b$ by time interval $c$ as shown in Fig. 2. Pulse 202' is applied through cathode input amplifier 36 to point 38, the plate of sync amplifier 14 in synchronizer 10. The normal code of pulse train 200 Fig. 2 appears at the point 38 each cycle but now with this invention an additional pulse 202' is added to pulse train 200 on each IFF cycle. This occurs only on IFF cycle since the IFF trigger at 20 is only generated every other cycle when the IFF operates. Thus the main pulse train preceding each IFF cycle, will be coded differently, as shown by waveform 206 Fig. 2. The main pulse train before each radar data cycle will remain unchanged as shown by waveform 200 Fig. 2.

Figure 1B:
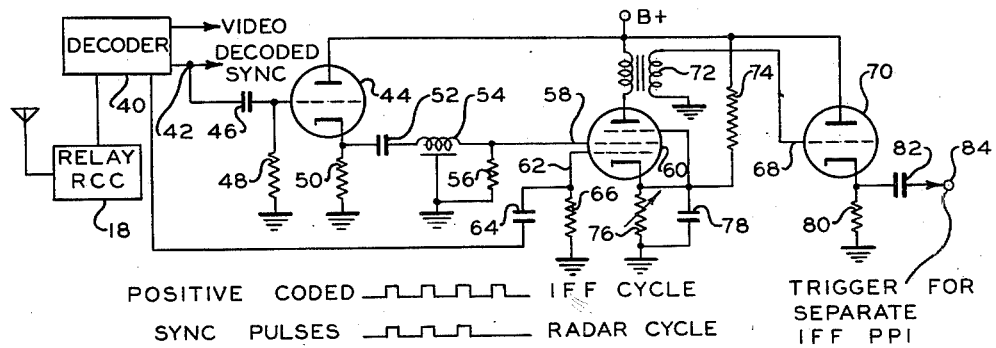
Fig. 1B shows part of the relay receiving and indicator system with more features of the invention and Fig. 2 shows some of the waveforms obtained.

Referring now to Fig. 1B, relay receiver 18 receives the synchronizing and video data, as described previously in the above mentioned applications, and applies the data to a decoder 40. Decoder 40 operates to separate the synchronizing data from the video data and to supply the video data to the remote indicators. As disclosed in application 631,746 cited above, for security reasons decoder 40 also provides a single output pulse 208 which is generated only if all three pulses of the normal main pulse train 200 are present. The output pulse, 208 Fig. 2, of decoder 40 will remain unchanged in spite of the special additional coding applied to the IFF trigger or main pulse train 200 Fig. 2. It will always appear as a single pulse delayed a time equal to $a+b$ as shown by pulse 208 Fig. 2. The other components shown in Fig. 1B have been added as part of this invention to provide a means of distinguishing the specially coded main pulse to operate a special P. P. I. solely for IFF presentation.

Figure 2:
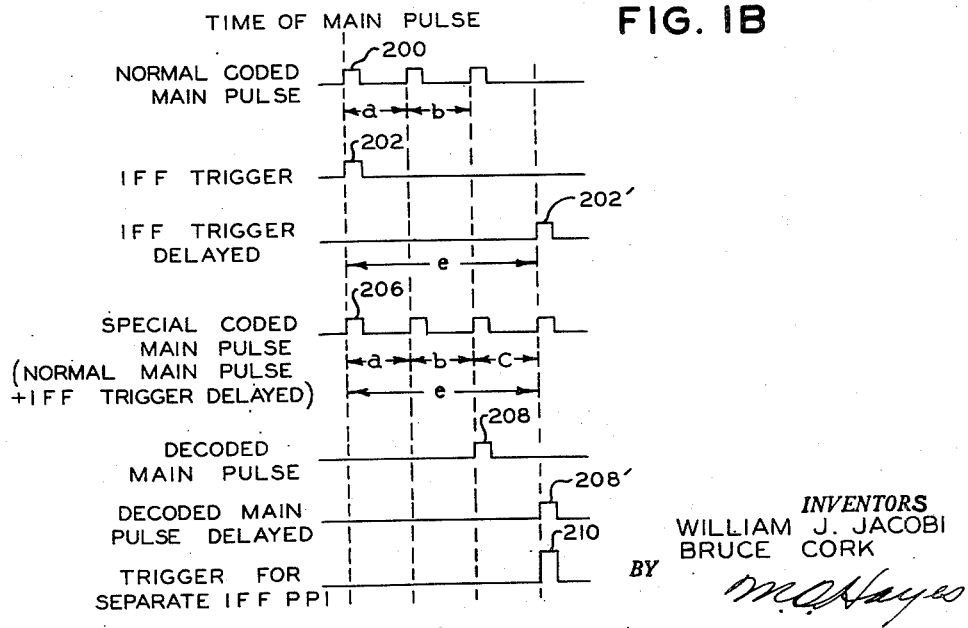

The main pulse output from the decoder at terminal 42, a single pulse 208 Fig. 2, delayed for a time period of $a+b$ as already explained, is applied to cathode follower 44 through coupling capacitor 46. Resistor 48 serves as a grid bias resistor. The same pulse is taken out from cathode follower 44 at cathode resistance 50 and is applied through coupling capacitor 52 to delay line 54. Delay line 54 delays the applied pulse 208 Fig. 2 a period equal to $c$ so that the same pulse delayed now for a period equal to $a+b+c$ or $e$, as shown by pulse 208' Fig. 2, is applied to the second grid 58 of coincidence tube 60. Resistance 56 terminates line 54 in its characteristic impedance. Pulse train 206 Fig. 2 is taken off from an early stage of decoder 40 before it is decoded and applied to control grid 62 of coincidence tube 60 through coupling capacitor 64. Resistance 66 serves as a grid bias resistance. Resistances 74 and 76 provide the cathode bias and resistance 76 is variable to control the bias. Capacitor 78 serves as a cathode by-pass capacitor. Now, on every IFF cycle coincidence will occur between the last pulse of waveform 206 Fig. 2 and pulse 208' Fig. 2. This will cause coincidence tube 60 to conduct on each IFF cycle and apply a positive pulse to grid 68 of cathode follower 70 from the transformer 72 in the plate circuit of coincidence tube 60. This puts out positive pulse 210 Fig. 2 which is taken off at cathode resistance 80 and coupled through capacitor 82 to the output terminal 84. From terminal 84 the trigger pulse 210 Fig. 2 is applied to an auxiliary P. P. I. not shown to trigger it only on each IFF cycle. Thus, the IFF which is applied to the regular P. P. I. indicator along with the radar is now displayed on a separate P. P. I. indicator by itself where sea return and other radar echoes will not blot out the IFF presentation.

It is believed that the construction and operation as well as the advantages of our improved radio relay system will be apparent from the foregoing detailed description thereof. It will also be apparent that while the invention is described in a preferred form changes may be made in the circuits disclosed without departing from the spirit of the invention as sought to be defined in the following claims.

What is claimed is:

1. In a radio relay system including means for periodically generating a main pulse train including a plurality of time spaced pulses, the time duration of said pulse train being short compared to the time interval between successive pulse trains, means for transmitting said main pulse train and first information signals, said first information signals being transmitted between successive main pulse trains, means for substituting second information signals for selected first information signals and means for receiving said main pulse train and said first and second information signals, said receiving means being adapted to generate a single pulse signal in response to each received main pulse train, apparatus for separating said received second information signals from said received first information signals, said apparatus comprising, means for generating an identifying pulse signal spaced in time by a predetermined interval from the first pulse in the main pulse train preceding the interval in which said second information signal is substituted for said first information signal, said identifying pulse being transmitted with said main pulse train with which it is associated, and means associated with said receiving means for generating a signal upon the joint reception of said main pulse train and said identifying pulse, said last-mentioned signal thereby being generated only at times immediately preceding the interval during which said second information signals are transmitted.

2. In a radio relay system including means for periodically generating a main pulse train including a plurality of time spaced pulses, the time duration of said pulse train being short compared to the time interval between successive pulse trains, means for transmitting said main pulse train and first information signals, said first information signals being transmitted between successive main pulse trains, means for substituting second information signals for selected first information signals and means for receiving said main pulse train and said first and second information signals, apparatus for separating said received second information signals from said received first information signals, said apparatus comprising, means for generating an identifying pulse signal coincident in time with the first pulse in the main pulse train preceding the interval in which said second information signal is substituted for said first information signal, means for delaying said identifying pulse signal by a time interval greater than the duration of said main pulse train, the output of said delaying means being coupled to said transmitting means so that said delayed identifying pulse signal is transmitted to said receiving means, and means associated with said receiving means for generating a signal upon the joint reception of said main pulse train and said delayed identifying pulse, said last-mentioned signal thereby being generated only at times immediately preceding the intervals during which said second information signals are transmitted.

3. In a radio relay system including means for periodically generating a main pulse train including a plurality of time spaced pulses, the time duration of said pulse train being short compared to the time interval between successive pulse trains, means for transmitting said main pulse train and first information signals, said first information signals being transmitted between successive main pulse trains, means for substituting second information signals for selected first information signals and means for receiving said main pulse train and said first and second information signals, said receiving means being adapted to generate a single pulse signal in response to each received main pulse train, apparatus for separating said received second information signals from said received first information signals, said apparatus comprising, means for generating an identifying pulse signal coincident in time with the first pulse in the main pulse train preceding the interval in which said second information signal is substituted for said first information signal, means for delaying said identifying pulse signal by a time interval greater than the duration of said main pulse train, the output of said delaying means being coupled to said transmitting means so that said delayed identifying pulse signal is transmitted to said receiving means, a coincidence circuit, second delay means coupling said single pulse generated by said receiving means to a first input of said coincidence circuit and means coupling the received delayed identifying pulse signals to a second input of said coincidence circuit, said coincidence circuit being adapted to produce an output signal upon the joint application of a signal at said first and second inputs.

References Cited in the file of this patent

UNITED STATES PATENTS

| | | |
|---|---|---|
| 1,802,745 | Whitaker | Apr. 28, 1931 |
| 1,843,227 | Herman | Feb. 2, 1932 |
| 1,856,376 | Desaivre | May 3, 1932 |
| 2,025,190 | Beverage | Dec. 24, 1935 |
| 2,092,442 | Colwell | Sept. 7, 1937 |
| 2,134,562 | Kimmich | Oct. 25, 1938 |
| 2,213,320 | Mathes et al. | Sept. 3, 1940 |
| 2,414,265 | Lawson | Jan. 14, 1947 |
| 2,457,986 | Edson | Jan. 4, 1949 |